April 25, 1961 G. RICHTER ET AL 2,981,502
AIRCRAFT ENGINE AIR INLET DEVICE
Filed July 28, 1959 4 Sheets-Sheet 1

INVENTORS
GERHARD RICHTER AND
PIERRE LOUIS GEORGES LHOSTE
BY:
Watson, Cole, Grindle & Watson
ATTORNEYS April 25, 1961 G. RICHTER ET AL 2,981,502
AIRCRAFT ENGINE AIR INLET DEVICE
Filed July 28, 1959 4 Sheets-Sheet 2
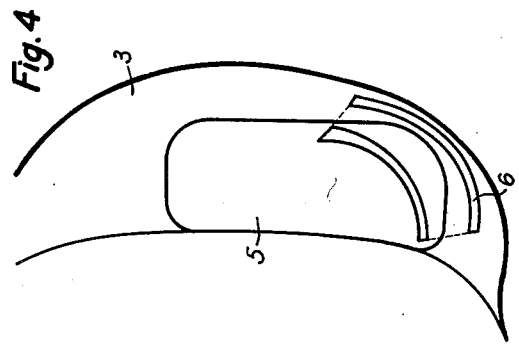
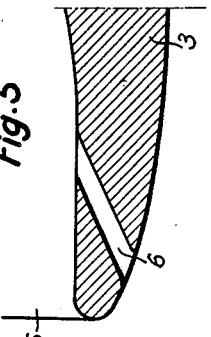
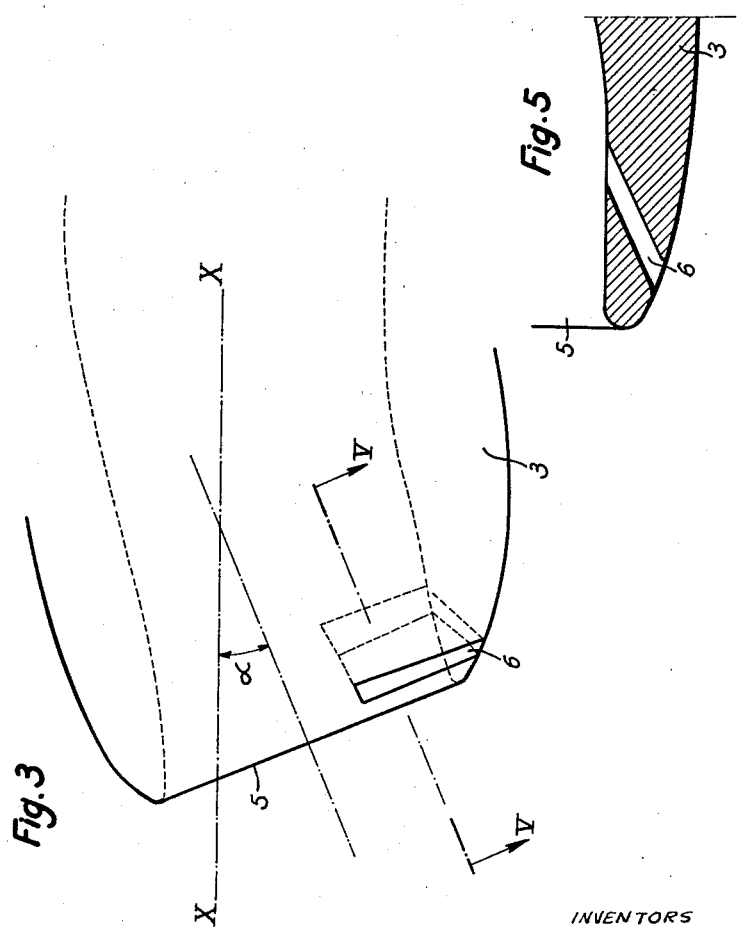
INVENTORS
GERHARD RICHTER And
PIERRE LOUIS GEORGES LHOSTE

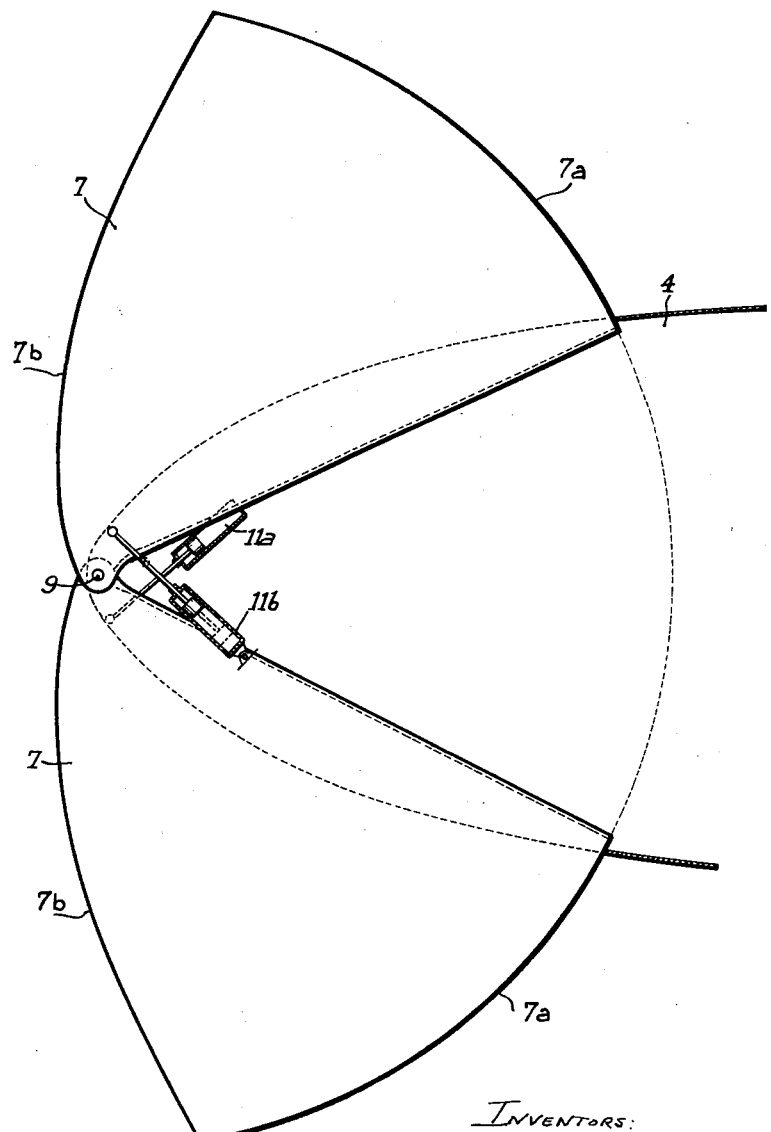

United States Patent Office 2,981,502
Patented Apr. 25, 1961

2,981,502
AIRCRAFT ENGINE AIR INLET DEVICE
Gerhard Richter, Dammarie-les-Lys, and Pierre Louis Georges Lhoste, Yerres, France, assignors to Societe Nationale d'Etudes et de Construction de Moteurs d'Aviation, Paris, France, a French company Filed July 28, 1959, Ser. No. 830,000
Claims priority, application France Aug. 13, 1958
4 Claims. (Cl. 244—53)

Conventional aircraft-engine air inlets generally reach their greatest efficiency at angles of incidence (the angle between the longitudinal axis of the aircraft and the direction of the relative wind) in the vicinity of 0°, and the efficiency decreases rapidly when the incidence exceeds 10° to 20°. This decrease in efficiency—and therefore in thrust—is accompanied by a poor distribution of velocities in front of the compressor, which may cause dangerous vibration in the compressor vanes, and may even make the engine cut out.

It is essential for the engine to operate absolutely reliably at large incidences of flight, for example with aircraft having a small aspect ratio (delta-wing) wherein the angle of incidence when flying in an approach to landing may reach 20° to 30°, or with aircraft which take off and land vertically, which often reach fairly high values of incidence during phases of changing trim, even if flattening out to the vertical position before coming down to land is carried out by zooming, which is not highly recommended. A vertical descent after such a zoom must in fact be made slowly; it therefore takes a long time and uses a large amount of fuel, which is a very great disadvantage for a vertical-take-off aircraft. It is most advantageous to shorten the said zoom, that is to say to obtain such a flattening-out trajectory that the aircraft starts to come down at the lowest possible height. This can only be done if the aircraft's angle of incidence alters progressively up to 90° and more during this transitional phase. This advantageous method of flattening out therefore depends on the operational conditions of air inlets at high values of incidence.

Furthermore, air-inlet characteristics are subject to much more strict requirements in vertical-take-off aircraft than in conventional aircraft, for another reason: static thrust loss due to the air inlet has a direct and very appreciable effect on the useful load and operational range of the aircraft. For instance, if a value of 0.25 is assumed for the ratio of useful load (including fuel) to the total weight at take-off, and fixed value for the ratio of effective thrust to weight, an increase of 1% in the efficiency of the inlet duct under static conditions increases the useful load by 4 to 5%. The operational range of the aircraft increases by a still greater percentage, since a large proportion of the fuel is consumed during take-off and landing operations.

The applicants have found that the performance of an aircraft capable of flying at high values of incidence is appreciably improved if the air-inlet orifice of the engine is inclined downwards with respect to the plane normal to the longitudinal axis of the aircraft, optimum results appearing to be obtained with an inclination of the order of 20 to 25°.

Comparative trials with a conventional air inlet normal to the axis of the aircraft and such a downwardly inclined air inlet have shown that, while in the first case head pressure losses increase very rapidly above an incidence of 10°, and reach prohibitive values, the results obtained with the inclined air inlet are very satisfactory up to incidences of the order of 30°.

Nevertheless, the fact of inclining the inlet duct gives rise to excessive velocity on the lower lip. When subsequent re-compression occurs, the flow separates inside the duct, and this flow separation makes itself felt as far as the inlet cross-section of the compressor.

This fault may easily be eliminated, or at least greatly reduced, in accordance with the invention, by means of an intake slot in the lower portion of the wall of the inlet duct behind the leading edge of the latter.

However, a downwardly inclined air inlet, even associated with such an intake slot, does not enable the inlet duct to be kept operating satisfactorily at values of incidence appreciably greater than 30°, and which may be as much as 90° and more.

The present invention relates to an improvement which enables as high values of incidence to be reached with high inlet duct efficiency, the said improvement residing in placing one or more deflector surfaces in front of the inlet orifice of the said duct, the said surface or surfaces being so arranged as to deflect the air flow of the relative wind towards the axis of the inlet duct, thus reducing the impinging angle of the said flow, and consequently the apparent incidence of flight with respect to the duct.

In an embodiment of the invention which is especially advantageous in the case of a double air inlet accommodated on either side of the fuselage, the inlet ducts having downwardly inclined inlet orifices are combined with an empennage arranged in canard fashion—that is to say in front of the main aerofoil—and so designed as to deflect the air flow of the relative wind towards the inlet of the ducts, as is desired, at high values of flight incidence. This canard empennage will advantageously consist of two lateral planes projecting from the nose of the fuselage, in front of and above the air-inlet orifices.

Such an empennage, which has the main function of deflecting air flow, inevitably exerts both drag and aerodynamic reaction of the aircraft, as does any rudder unit. This aerodynamic action may be beneficial or prejudicial to stability, according to the design of the aircraft and the configuration of flight.

In the case of annular-wing aircraft, the present invention provides for the empennage to be retracted during normal low-incidence flights, the said unit protruding only for high-incidence flight, which is clearly of very short duration.

The following description, with reference to the appended drawings, which are given by way of non-limitative examples, will give a good understanding of how the invention may be embodied.

Figure 3 is an external diagrammatic view on a larger scale of the inlet duct.

Figure 4 is an end view thereof.

Figure 5 is a section along V—V in Figure 3.

Figure 8 shows another arrangement of the invention.

Figure 2:
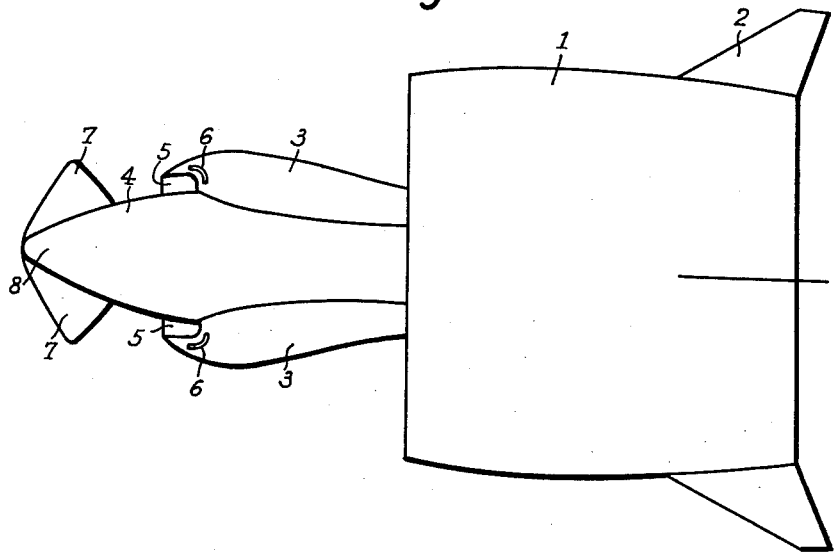
Figure 2 is a view thereof from below.
Figure 1:
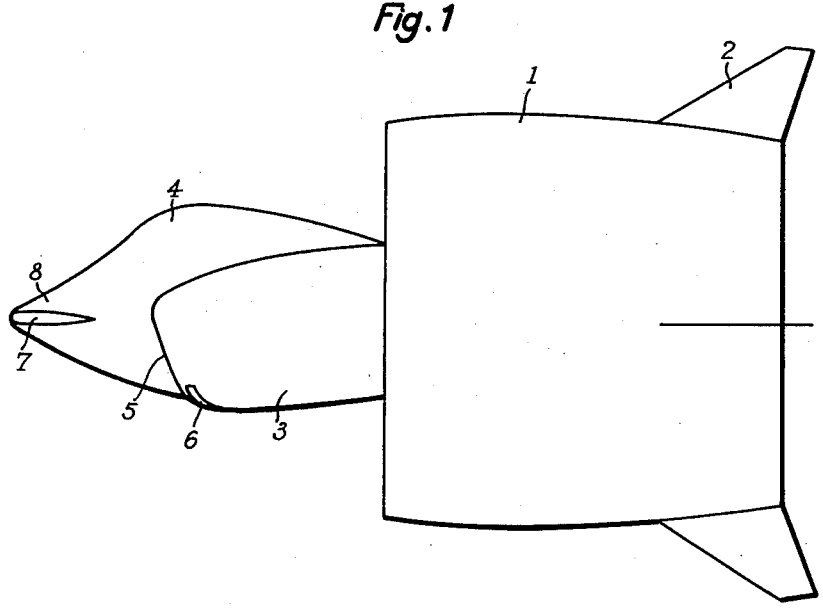
Figure 1 is a diagrammatic profile view of an improved aircraft according to the invention.

Figures 1 and 2 illustrate a vertical-flight aircraft of the "coléoptère" type having an annular wing 1 equipped with deflectors 2, and driven by a jet engine whose air-inlet ducts may be seen at 3—3, on either side of a central fuselage 4.

The inlet orifice 5 to the duct 3 of each side is inclined downwards, with respect to the longitudinal axis X—X of the aircraft, at an angle α of about 22.5° (see Figure 3). There is a slot 6 (see also Figures 4 and 5) in the lower part of the inlet duct 3, at a short distance behind the leading edge. This slot, which is inclined in the direction of flow, enables ambient air to be aspirated, thus preventing the internal flow separation due to the excess of velocity on the lower lip of the inlet duct.

In front of and slightly above the inlet orifices 5 there are two surfaces 7—7 protruding laterally from the nose 8 of the fuselage 4. In the example shown in Figures 1 and 2, these surfaces are plane and horizontal (if the axis of the aircraft is itself horizontal). The two lateral planes 7—7 form a rudder unit of the so-called canard type.

As explained above, the empennage, being situated in front of and above the inlet orifices 5, fulfills the function of an air-deflector while the aircraft is tilting, without to that extent interfering with duct-inlets. The flow of air thus deflected enters the said ducts at a smaller angle than in the absence of such a empennage.

The deflector planes 7—7 only become really effective at a flight incidence of more than about 20°. At lower values of incidence, and in particular in normal flight, they set up deleterious additional drag, and furthermore form an auxiliary aerofoil producing a lift which is added to that of the main annular aerofoil; this has the effect of displacing the center of lift of the aircraft to the front, which may be detrimental.

In order to avoid this disadvantage, the present invention provides for a retractable empennage device which enables the two surfaces 7—7 to be withdrawn into the nose 8.

Figure 6:
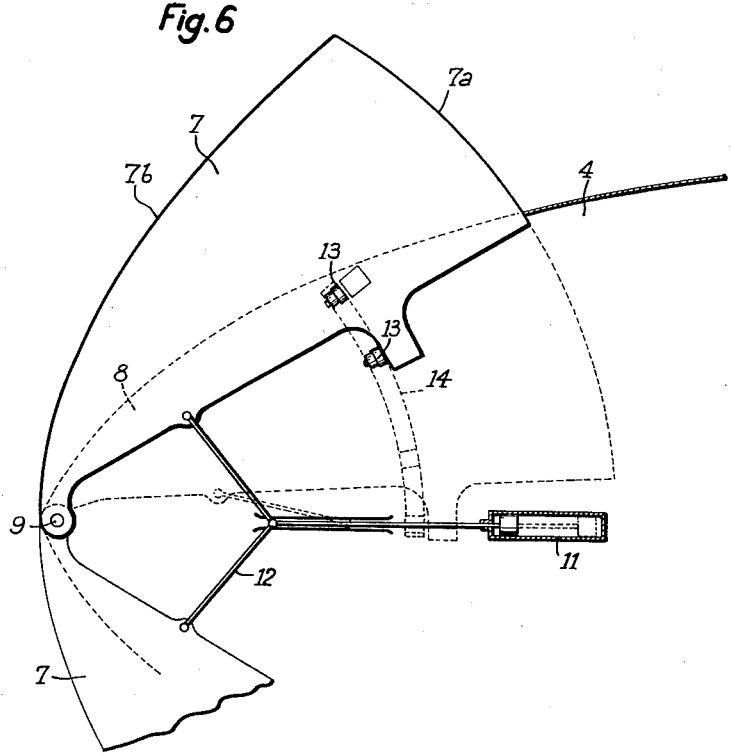
Figures 6 and 7 are plan and profile views respectively of a retractable canard empennage.
Figure 7:
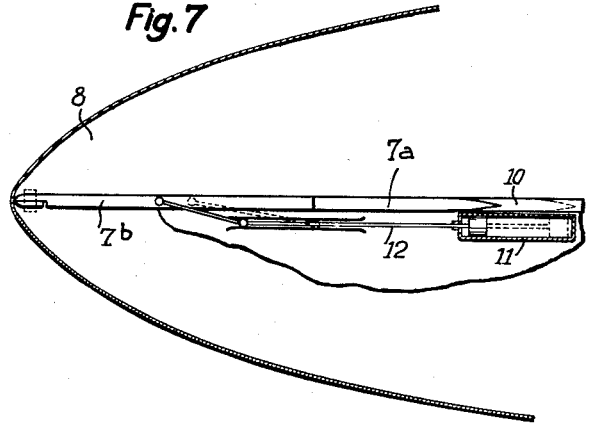

Figures 6 and 7 illustrate control means for a retractable empennage wherein the plane surfaces 7—7 are articulated to a pin 9, perpendicular to their plane, and situated at the end of the nose 8, which comprises longitudinal slots 10 to enable the surfaces 7—7 to pass through. Angular displacement of the latter in their plane about the pin 9 is controlled by a double-acting jack 11 by means of a suitable system of rods 12. The surfaces 7—7 are guided by rollers 13 and roller tracks 14.

The said surfaces are bounded at the rear by an arc of a circle 7a centered on the pivot 9, and at the front by an inwardly curved edge 7b which exactly fits the general profile of the nose 8 in the withdrawn position.

A surface 7 is illustrated in Figure 6 in its projecting position in full line, and in its withdrawn position in dashed line.

In this method of embodiment, the two surfaces 7—7, each corresponding to an air inlet 5, are adjacent in the folded-back position, and move in the same plane.

However, if it is desired to have a larger stroke or surfaces of larger span, they may be disposed in two adjacent parallel planes so that they are superposed in the folded-back position. In this case, the surfaces may be controlled by separate jacks 11a, 11b (see Figure 8).

What is claimed is:

1. An aircraft with a fuselage and an engine housed therein, comprising an air-intake system for said engine having symmetrically arranged inlet orifices opening laterally of said fuselage and facing forwardly and downwardly when the aircraft is in a horizontal attitude, and symmetrically arranged planar surfaces extending substantially parallel to the longitudinal axis of the aircraft and projecting laterally of the forward end of said fuselage, each surface being positioned exteriorly and in front of an inlet orifice, whereby the plane of said surfaces forms an obtuse angle with said inlet orifices.

2. Aircraft as claimed in claim 1, wherein the planar surfaces are retractable within the fuselage and pivot about a common axis perpendicular to said surfaces and located at the forward end of said fuselage.

3. Aircraft as claimed in claim 2, wherein the retractable planar surfaces are in the general shape of a curvilinear-sided triangle having a vertex at the pivot of the surfaces and a rear edge in the form of an arc of a circle centered on said pivot.

4. Aircraft as claimed in claim 1, further comprising a freely-opened slot-like passage extending at the lower part of each inlet orifice, just to the rear of the leading edge thereof and adapted to provide a boundary layer control in the air-intake system.

References Cited in the file of this patent

UNITED STATES PATENTS

| | | |
|---|---|---|
| 2,384,893 | Crook | Sept. 18, 1945 |
| 2,601,962 | Douglas | July 1, 1952 |
| 2,699,906 | Lee | Jan. 18, 1955 |
| 2,772,057 | Fischer | Nov. 27, 1956 |